US010054940B2

(12) United States Patent
Solyom et al.

(10) Patent No.: US 10,054,940 B2
(45) Date of Patent: Aug. 21, 2018

(54) METHOD AND SYSTEM FOR ASSISTING A DRIVER

(71) Applicant: VOLVO CAR CORPORATION, Gothenburg (SE)

(72) Inventors: Stefan Solyom, Olofstorp (SE); Marcus Nils Gunnar Rothoff, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/106,932

(22) Filed: Dec. 16, 2013

(65) Prior Publication Data
US 2014/0172221 A1    Jun. 19, 2014

(30) Foreign Application Priority Data
Dec. 19, 2012 (EP) .................................. 12198051

(51) Int. Cl.
| | | |
|---|---|---|
| *G05D 1/00* | (2006.01) | |
| *B62D 15/02* | (2006.01) | |
| *G08G 1/16* | (2006.01) | |
| *B60W 30/00* | (2006.01) | |

(52) U.S. Cl.
CPC ........... *G05D 1/0055* (2013.01); *B60W 30/00* (2013.01); *B62D 15/025* (2013.01); *B62D 15/0285* (2013.01); *G08G 1/167* (2013.01); *G08G 1/168* (2013.01)

(58) Field of Classification Search
None
See application file for complete search history.

(56) References Cited

U.S. PATENT DOCUMENTS

| | | | | |
|---|---|---|---|---|
| 5,572,449 A | * | 11/1996 | Tang ................... | B60K 31/0008 180/170 |
| 6,038,496 A | | 3/2000 | Dobler et al. | |
| 6,170,591 B1 | * | 1/2001 | Sakai et al. ........... | 180/204 |
| 6,370,471 B1 | * | 4/2002 | Lohner .............. | B60K 31/0008 701/36 |

(Continued)

FOREIGN PATENT DOCUMENTS

| | | |
|---|---|---|
| CN | 102795224 A | 11/2012 |
| DE | 102011007016 | 10/2012 |

(Continued)

OTHER PUBLICATIONS

Extended European Search Report for EP 12198051.0, Completed by the European Patent Office dated Apr. 30, 2013.

(Continued)

*Primary Examiner* — Redhwan K Mawari
*Assistant Examiner* — Edward Torchinsky
(74) *Attorney, Agent, or Firm* — Brooks Kushman P.C.

(57) ABSTRACT

A method is provided for assisting a driver of a vehicle. The method may include performing a lateral control of the vehicle in an autonomous mode, determining information about a surroundings of the vehicle, checking whether a longitudinal control of the vehicle performed by the driver is appropriate considering the determined information about the surroundings, and, if appropriate, continuing an autonomous mode of the lateral control of the vehicle. A driver assist system is also provided for performing the method.

20 Claims, 3 Drawing Sheets

(56) References Cited

U.S. PATENT DOCUMENTS

| | | | |
|---|---|---|---|
| 7,592,920 B2* | 9/2009 | Kopf | B60Q 9/008 340/425.5 |
| 7,610,134 B2* | 10/2009 | Maeda et al. | 701/41 |
| 8,065,058 B2* | 11/2011 | Luke | 701/41 |
| 8,115,653 B2* | 2/2012 | Scherl et al. | 340/932.2 |
| 8,706,342 B1* | 4/2014 | Szybalski | B60W 50/14 382/106 |
| 9,043,115 B2 | 5/2015 | Schuberth et al. | |
| 9,446,918 B2* | 9/2016 | Hecky | B65G 63/004 |
| 9,604,652 B2* | 3/2017 | Strauss | B60W 50/082 |
| 2006/0190147 A1* | 8/2006 | Lee et al. | 701/26 |
| 2007/0051547 A1* | 3/2007 | Fischer et al. | 180/204 |
| 2007/0282499 A1* | 12/2007 | Maeda et al. | 701/41 |
| 2009/0085771 A1* | 4/2009 | Wu | B62D 15/0285 340/932.2 |
| 2010/0253493 A1* | 10/2010 | Szczerba | G01S 13/723 340/435 |
| 2013/0124041 A1* | 5/2013 | Belser et al. | 701/41 |

FOREIGN PATENT DOCUMENTS

| | | | | |
|---|---|---|---|---|
| EP | 2314489 B1 * | 9/2010 | | B16W 30/17 |
| JP | 2006123711 | 5/2006 | | |
| WO | 2005100134 | 10/2005 | | |

OTHER PUBLICATIONS

Chinese Office Action issued by the Chinese Patent Office for Application Serial No. CN 2013106809655, dated Mar. 27, 2017, 11 pages (original and machine translation).
Search Report issued by the Chinese Patent Office for Application Serial No. CN 2013106809655, dated Mar. 17, 2017, 1 page.

* cited by examiner

METHOD AND SYSTEM FOR ASSISTING A DRIVER

CROSS-REFERENCE TO RELATED APPLICATIONS

This application claims foreign priority benefits under 35 U.S.C. § 119(a)-(d) to European patent application number 12198051.0, filed Dec. 19, 2012, which is incorporated by reference in its entirety.

TECHNICAL FIELD

The present disclosure relates to a method and system for assisting a driver of a vehicle.

BACKGROUND

It is known to use lane-keeping aid systems in order to help the driver of a vehicle to keep the vehicle in a desired lane. An example of a lane-keeping aid system is given in U.S. Pat. No. 6,038,496, wherein an optical scanning system is used to detect a lane boundary. If the vehicle is about to leave the lane, the driver will be warned. The system may also be used to warn a driver falling asleep. The system may comprise a lateral spacing regulation used for automatic lane maintenance. The lateral spacing regulation system regulates the distance of the vehicle from a lateral lane marking by a value that can be preset by the driver. The lateral spacing regulation system may further be combined with an intelligent cruise control regulation, which includes a distance warning or a distance regulation at the front of the vehicle.

However, the system of U.S. Pat. No. 6,038,496 is intended for lane keeping on motorways and other well-constructed main roads with easily detectable lane markings. For example, the system does not permit activation of the lateral spacing regulation as long as the speed of the vehicle is less than 50 km/h, or when no sufficiently reliable detectable lane markings are available.

SUMMARY

An object of the present disclosure is to overcome or ameliorate at least one of the disadvantages of the prior art, or to provide a useful alternative.

It is desirable to provide a method and a system for assisting a driver of a vehicle, which are applicable also at low speeds.

It is further desirable that the method and the system are independent of detectable lane markings.

The object above may be achieved by the subject-matter of claim 1.

Thus, in a first aspect of the present disclosure there is provided a method for assisting a driver of a vehicle comprising the steps of:
- a lateral control system of the vehicle performing a lateral control of the vehicle in an autonomous mode,
- determining information about a surroundings of the vehicle,
- checking whether a longitudinal control of the vehicle performed by the driver is appropriate considering the determined information about the surroundings, and
- if appropriate, continuing the autonomous mode of the lateral control.

The method according to the disclosure helps the driver to drive the vehicle. Since the system takes care of the lateral control, the driver is relieved from some of the driving tasks, since the vehicle may in a partly autonomous way adapt to the surroundings. The lateral control system may for example be set to follow a vehicle in front, following it even if it changes the lane, e.g. in order to overtake a broken-down or slow-going vehicle. In another application, the lateral control system may be instructed to park the vehicle in a parking area or to drive the vehicle out of the parking area. It is possible to perform the method according to the disclosure in dense traffic, e.g. in urban traffic. Since it is evaluated that the driver reacts in an appropriate way as regards the longitudinal control of the vehicle, it is ensured that the driver is mentally present. It is therefore possible to have a high automation level for the lateral control of the vehicle, without compromising with the safety of the vehicle. It is for example possible to let the lateral control system change lane of the vehicle or perform a 90 degree turn of the vehicle to a free parking place or around a corner. In case the driver uses a pedal to perform the longitudinal control, the hands may then be free for other tasks, e.g. eating a hamburger. The method according to the disclosure thus differs from a method being performed in a prior art lane-keeping aid system.

The term "autonomous mode" is intended to mean a mode wherein a system of the vehicle performs the control, in this case the lateral control of the vehicle, without intervention from the driver.

The term "longitudinal" is defined as being in the longitudinal direction of the vehicle, i.e. normally the travelling direction of the vehicle. The term "lateral" defines the perpendicular direction to the longitudinal direction. It should be noted that "perpendicular" is intended to be interpreted in a broad manner, likewise including minor deviations to perpendicular.

The term "lateral control" comprises moving the vehicle in the desired direction. The purpose of the lateral control is to maintain appropriate lateral distances to other dynamic and stationary objects, e.g. other vehicles, cyclists, pedestrians, animals, barriers, light posts, road signs etc. The "appropriate lateral distance" is selected from a safety point of view. The level may vary. It depends on factors such as speed of the own vehicle, speed of the dynamic object, traffic situation and weather conditions. It is for example suitable to use larger lateral distances at high speeds and/or on slippery roads. Further, it may be possible for the driver to influence the setting of appropriate lateral distance by giving a manual input. Purely as an example, a cautious driver may want to increase the level of the appropriate lateral distance.

The lateral control may be performed by determining a centreline of the vehicle in front, e.g. by means of a camera system, a lidar etc. Then the own vehicle may be controlled to follow this centreline, as if it was painted on the road, e.g. by means of steering control actions or individual braking operations giving a steering moment.

In order to determine information about the surroundings one or more sensors may be utilized, such as a radar, a lidar, a camera, an IR camera and/or an ultrasonic sensor. The information may also be determined from a map, e.g. stored in the vehicle or centrally stored and wirelessly transmitted to the vehicle. Information may further be sent to the vehicle using a GPS system. Information may also be sent from other vehicles, vehicle2vehicle communication, or from other dynamic or stationary road objects, such as a road camera. Information may also be given as input from the driver or a passenger of the vehicle.

The "longitudinal control" comprises keeping an appropriate distance, expressed in seconds and/or in meters, to the vehicle being substantially in front of the own vehicle, e.g. driving in the same lane.

The determined information about the surroundings is used for checking if the driver performs the longitudinal control in an appropriate way. Performing the longitudinal control comprises braking, accelerating, driving at constant speed and reversing the vehicle. The purpose of the check is to ensure that the driver is mentally present. It may e.g. be checked that there is a minimum distance and/or a minimum time span to the vehicle in front. What minimum longitudinal distance is appropriate varies and depends on the determined information about the surroundings. It thus depends on factors such as speed of the own vehicle, the speed of the vehicle being substantially in front of the own vehicle and weather conditions. It is for example suitable to use larger longitudinal distances/time spans at high speeds and/or on slippery roads. It may further be checked that the speed of the vehicle follows the speed limit of the road the vehicle is driving on. It may also be checked if the driver adapts the speed to the actual traffic situation, e.g. driving slower in a complex traffic situation involving another vehicle, a cyclist and/or a pedestrian. Further, it can be checked if the driver adapts to a current weather situation, such as precipitation, e.g. rain, hail or snow, or icy roads. Braking and accelerating at the same time may be deemed as inappropriate. It may also be possible for the driver to influence the setting of "appropriate" by giving a manual input. Purely as an example, a cautious driver may want to increase the level of the minimum longitudinal distance and/or minimum time span to the vehicle in front.

The determined information about the surroundings may also be used as input for the lateral control system, e.g. if the lateral control system is set to follow the vehicle in front.

If the check determines that the driver performs the longitudinal control in an appropriate way, the vehicle will continue the autonomous mode of the lateral control.

The autonomous mode of the lateral control may comprise a change of travelling direction of the vehicle in the range of 0 to +/−30°, preferably 0 to +/−60°, more preferably 0 to +/−90°, most preferably 0 to +/−120°. Thereby it is possible to change lane, or to perform a 90 degree turn to a free parking place or around a corner. 0° means driving straight ahead, while +30° means turning 30° to the right and −30° means turning 30° to the left. The range of 0 to +/−30° thus means continuing straight ahead or turning up to 30° either to the left or to the right, hence defining a 60° sector. The turns are associated with corresponding torques applied to the steering system of the vehicle.

The driver may use a longitudinal control means to perform the longitudinal control, i.e. for accelerating, driving at constant speed and/or braking the vehicle. Typically the longitudinal control means is a pedal, such as a brake pedal or an accelerator pedal. The driver then uses the foot on the brake pedal and/or on the accelerator pedal to perform the longitudinal control. However, it is also possible to, in addition and/or as an alternative, operate the longitudinal control functions by a hand, e.g. if the driver cannot use the foot, or in any other appropriate way.

In an embodiment, the input from the driver in order to perform the longitudinal control is given via the longitudinal control means only. The driver then has the hands free for other tasks, in case the longitudinal control means is a pedal. There then is no requirement to keep at least one hand on the steering wheel. Instead the hand may be used for eating or operating the infotainment system.

If the driver wants to, the driver can abort the loop at any time to instead drive the vehicle in a non-autonomous way.

The method may further comprise the step of:
instructing the driver to act, if the check indicates that the longitudinal control of the vehicle performed by the driver is inappropriate. The driver may be instructed to brake or accelerate in order to exercise the longitudinal control. If the driver follows the instructions, the longitudinal control is deemed as appropriate, and the vehicle will continue the autonomous mode of the lateral control.

If the check indicates that the longitudinal control of the vehicle performed by the driver is inappropriate, the method may further comprise the step of:
leaving the autonomous mode of the lateral control.

This step may be performed if the driver, although being instructed to act, still does not perform the longitudinal control appropriately. Alternatively, the autonomous mode of the lateral control may be left without first instructing the driver to act. For example, the vehicle may first leave the autonomous mode of the lateral control, and then the driver may be instructed to act. This could save time in a traffic situation. However, the driver may be informed about that the vehicle is about to leave the autonomous mode, e.g. by an audible and/or visible and/or haptic signal. It may e.g. be a warning sound and/or a warning light and/or a vibration of the longitudinal control means, steering wheel and/or seat.

If the check indicates that the longitudinal control of the vehicle performed by the driver is inappropriate, the driver may instead of being instructed to act, or in addition, be encouraged to take over the lateral control from the lateral control system. The vehicle then leaves the autonomous mode of the lateral control.

If the check indicates that the longitudinal control of the vehicle performed by the driver is inappropriate, the method may further comprise the step of:
entering a safe state of the vehicle.

This step may be performed directly when the vehicle leaves the autonomous mode of the lateral control. It may also be performed if the driver, although being instructed to act, still does not perform the longitudinal control appropriately. The vehicle may for example be driven to the side of the road and brought to a standstill without any sudden speed changes, which could cause problems for other road drivers. The entering of a safe state is for example appropriate, if the driver is unable to drive the vehicle, e.g. having fallen asleep or being unconscious due to a sudden illness. The driver may be informed about that the vehicle is entering the safe state, e.g. by an audible and/or visible and/or haptic signal.

The vehicle may also go to a fully autonomous mode, wherein both the lateral control and longitudinal control is performed autonomously. This may be appropriate if driving at slow speed outside a road, e.g. on a parking area. However, before going to a fully autonomous mode, safety requirements should be considered. Purely as an example, in many countries fully autonomous vehicles are not permitted to drive on the roads.

The method according to the disclosure is suitable in urban traffic, e.g. at a speed below 70 km/h, preferably below 50 km/h and most preferably below 30 km/h. As mentioned above, the autonomous mode of the lateral control may comprise a change of travelling direction of the vehicle in the range of 0 to +/−30°, preferably 0 to +/−60°, more preferably 0 to +/−90°, most preferably 0 to +/−120°. Such changes of travelling direction typically occur in urban traffic, e.g. in intersections, when turning around a corner or when parking the vehicle.

The lateral control may at least partly be based on detection of a static and/or a dynamic object adjacent to the vehicle, e.g. another vehicle, a cyclist, a pedestrian, an animal, a barrier, a light post, a road sign. Normally, many objects are considered at the same time. The definition of being adjacent varies dependent on the traffic situation, by factors such as the speed of the own vehicle and the speeds of the other objects and the weather conditions. The adjacent objects are objects, which are close enough to influence the lateral control of the vehicle. The lateral control may be set to follow the vehicle in front, if it changes the lane, e.g. in order to overtake a broken-down or slow-going vehicle.

With knowledge of vehicle in front, stationary and dynamic objects, a clear path can be predicted to follow. The path will depend on the known environment by use of sensors and/or external information such as a map. In right-hand traffic countries, the path can be routed to keep towards the right side to follow traffic and to allow clearance to possible oncoming cars etc. when for example driving in a parking area, and vice versa for left-hand traffic countries. The distances to stationary or dynamic objects may be defined with a safety margin still optimizing the lateral control to maintain a stable and smooth control for the lateral control.

Also the check if the longitudinal control of the vehicle performed by the driver is appropriate or not may be based on detection of a static and/or a dynamic object adjacent to the vehicle.

The lateral control may be independent of detectable lane markings. The term lane marking is used herein to denote markings made on the road, normally painted on the road, to mark a lateral limit of a lane. For example, smaller roads, streets and parking areas often lack lane markings.

In a second aspect of the present disclosure, there is provided a driving assist system of a vehicle, the system comprising
  a detection means for determining information about a surroundings of the vehicle,
  a lateral control system for an autonomous lateral control of the vehicle,
  a longitudinal control means for performing longitudinal control of the vehicle, and
  a checking system for checking whether a longitudinal control of the vehicle performed by a driver of the vehicle is appropriate considering the determined information about the surroundings.

The detection means may comprise one or more sensors, such as a radar, a lidar, a camera, an IR camera and/or an ultrasonic sensor. The information may also be determined from a map, e.g. stored in the vehicle or centrally stored and wirelessly transmitted to the vehicle. Information may further be sent to the vehicle using a GPS system. Information may also be sent from other vehicles, vehicle2vehicle communication, or stationary road objects, such as a road camera.

The driver may use the longitudinal control means to perform the longitudinal control, i.e. for accelerating, driving at constant speed and/or braking the vehicle. Typically the longitudinal control means is a pedal, such as a brake pedal or an accelerator pedal. The driver then uses the foot on the brake pedal and/or on the accelerator pedal to perform the longitudinal control. However, it is also possible to operate the longitudinal control functions by a hand, e.g. if the driver cannot use the foot, or in any other appropriate way.

The determined information is used as input to the checking system for checking if the driver performs the longitudinal control in an appropriate way. The determined information may also be used as input for the lateral control system.

If the checking system determines that the driver performs the longitudinal control in an appropriate way, the vehicle will continue the autonomous mode of the lateral control. A signal may thus be sent from the checking system to the lateral control system.

The lateral control system may be adapted to perform a change of travelling direction of the vehicle in the range of 0 to +/−30°, preferably 0 to +/−60°, more preferably 0 to +/−90°, most preferably 0 to +/−120°.

The driving assist system may further comprise means for instructing the driver to act and/or means for entering a safe state of the vehicle adapted to be used, if the checking system indicates that the longitudinal control performed by the driver is inappropriate. The means for instructing the driver to act may comprise providing an audible or visible signal. It may be a synthetic voice instructing the driver via a loudspeaker, or an alarm giving a warning sound. It may be a warning light, e.g. on the dashboard. Information may be shown on a head-up display.

In a third aspect of the present disclosure, there is provided a use of the above-mentioned driving assist system for assisting a driver in urban traffic.

There is provided a use of the above-mentioned driving assist system for assisting a driver at a speed below 70 km/h, preferably below 50 km/h and most preferably below 30 km/h.

BRIEF DESCRIPTION OF THE DRAWINGS

The present disclosure will hereinafter be further explained by means of non-limiting examples with reference to the appended drawings wherein.

Figure 1:
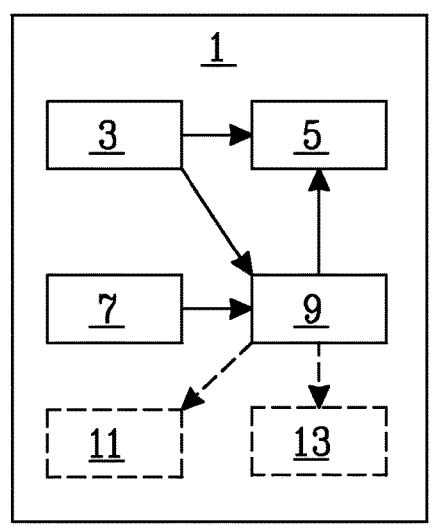
FIG. 1 is a schematic view of a vehicle comprising a system according to the disclosure.

It should be noted that the appended drawings are not necessarily drawn to scale and that dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure defined by the appended claims. Details from two or more of the embodiments may be combined with each other. Features in the drawings may be exaggerated or minimized to show details of particular components. Well-known functions or constructions will not necessarily be described in detail for brevity and/or clarity.

FIG. 1 schematically illustrates a driving assist system 1 of a vehicle, the system comprising
  a detection means 3 for determining information about the surroundings of the vehicle,
  a lateral control system 5 for an autonomous lateral control of the vehicle,
  a longitudinal control means 7 for performing longitudinal control of the vehicle, and a checking system 9 for checking whether a longitudinal control of the vehicle performed by a driver of the vehicle is appropriate considering the determined information about the surroundings.

The detection means 3 may comprise one or more sensors, such as a radar, a lidar, a camera, an IR camera and/or an ultrasonic sensor. The information may also be determined from a map, e.g. stored in the vehicle or centrally stored and wirelessly transmitted to the vehicle. Information may further be sent to the vehicle using a GPS system. Information may also be sent from other vehicles, vehicle2vehicle communication, or stationary road objects, such as a road camera. Information may also be given as input from the driver or a passenger of the vehicle.

The driver may use the longitudinal control means 7 to perform the longitudinal control, i.e. for accelerating, driving at constant speed, braking and/or reversing the vehicle. Typically the longitudinal control means 7 is a pedal, such as a brake pedal and/or an accelerator pedal. The driver then uses the foot on the brake pedal and/or on the accelerator pedal to perform the longitudinal control. Normally, the driver either uses the brake pedal or the accelerator pedal, but the system would work also in case both pedals are operated at the same time. However, it is also possible to operate the longitudinal control functions by a hand, e.g. if the driver cannot use the foot, or in any other appropriate way.

The determined information is used as input to the checking system 9 for checking if the driver performs the longitudinal control in an appropriate way. The determined information may also be used as input for the lateral control system 5.

If the checking system 9 determines that the driver performs the longitudinal control in an appropriate way, the vehicle will continue the autonomous mode of the lateral control. A signal may thus be sent from the checking system 9 to the lateral control system 5.

The driving assist system 1 may optionally further comprise means 11 for instructing the driver to act and/or means 13 for entering a safe state of the vehicle. The means 11, 13 are adapted to be used if the checking system 9 indicates that the longitudinal control performed by the driver is inappropriate.

Figure 2:
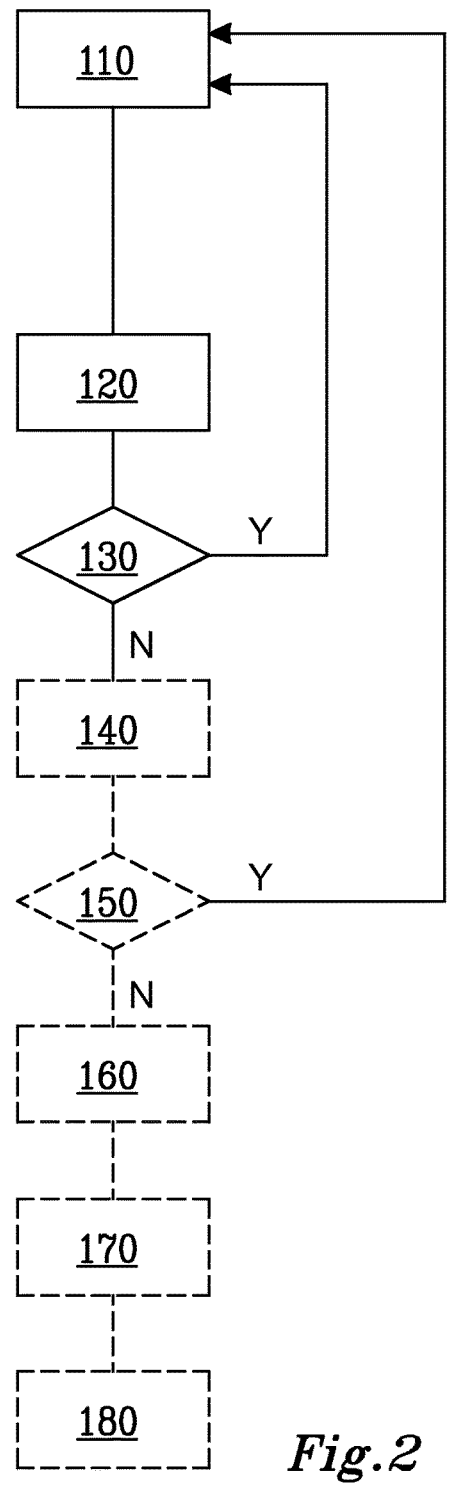
FIG. 2 is a flow-chart of a method according to the disclosure.

FIG. 2 is a flowchart of a method according to the disclosure. Dashed lines of some of the boxes in FIG. 2 indicate that the action is optional. In its simplest form the method comprises the steps of:

110: A lateral control system of the vehicle performing a lateral control of the vehicle in an autonomous mode,

120: Determining information about a surroundings of the vehicle,

130: Checking whether a longitudinal control of the vehicle performed by a driver is appropriate considering the determined information about the surroundings, and if appropriate, continuing the autonomous mode of the lateral control.

Steps 110 and 120 may be performed after each other or in parallel to each other. Further, step 110 may also be performed in parallel to step 130.

The information about the surroundings may be determined by means of one or more sensors, such as a radar, a lidar, a camera, an IR camera and/or an ultrasonic sensor. The information may also come from a map, e.g. stored in the vehicle or centrally stored and wirelessly transmitted to the vehicle. Information may be sent using the GPS system. Information may also be sent from other vehicles, vehicle2vehicle communication, or stationary road objects, such as a road camera. Information may also be given as input from the driver or a passenger of the vehicle.

The determined information about the surroundings is used to check if the driver performs the longitudinal control in an appropriate way. It may e.g. be checked that there is a minimum distance and/or minimum time span to the vehicle in front. It may further be checked that the speed of the vehicle follows the speed limit of the road the vehicle is driving on. It may also be checked if the driver adapts the speed to the actual traffic situation, e.g. driving slower in a complex traffic situation involving another vehicle, a cyclist and/or a pedestrian. Further, it can be checked if the driver adapts to a current weather situation, such as precipitation or slippery roads.

The determined information about the surroundings may also be used as input for the lateral control system.

If the check shows that the driver performs the longitudinal control in an appropriate way, the vehicle continues the autonomous mode of the lateral control, illustrated in FIG. 2 as the method going back to step 110 again.

The vehicle may thus continue in the autonomous mode of the lateral control as long as the driver performs the longitudinal control in an appropriate way. The method then goes round in a loop: 110-120-130-110-120-130-110 . . . .

If the driver wants to, the driver can abort the loop at any time to instead drive the vehicle in a non-autonomous way.

If it in step 130 is detected that the driver does not perform the longitudinal control in an appropriate way, the driver may be instructed to act, e.g. instructed to brake or instructed to accelerate, optional step 140.

Then it may be checked again, optional step 150, whether the longitudinal control of the vehicle performed by the driver is appropriate considering the determined information about the surroundings, similar to step 130. If the driver has followed the instructions, the performance is deemed as appropriate and the vehicle will continue the autonomous mode of the lateral control, illustrated in FIG. 2 as the method going back to step 110 again.

However, if the driver, although being instructed in optional step 140, does not perform the longitudinal control in an appropriate way according to the check in optional step 150, the vehicle may, according to some embodiments, leave the autonomous mode of the lateral control, optional step 160.

Alternatively, optional steps 140 and 150 may be skipped, such that the vehicle directly leaves the autonomous mode of the lateral control, optional step 160, if it is detected that the driver does not perform the longitudinal control in an appropriate way in step 130. For example, the vehicle may first leave the autonomous mode of the lateral control, and then the driver may be instructed to act. This could save time in a traffic situation. However, the driver is in that case may be informed about that the vehicle is about to leave the autonomous mode, e.g. by an audible and/or visible and/or haptic signal. It may e.g. be a warning sound and/or a warning light and/or a vibration of the longitudinal control means, steering wheel and/or seat.

After the vehicle has left the autonomous mode of the lateral control, optional step 160, the driver is encouraged to take over the lateral control of the vehicle from the lateral control system, optional step 170.

Alternatively, or in case the driver although being encouraged to does not take over the lateral control of the vehicle from the lateral control system, the vehicle may enter a safe state, optional step 180. The vehicle may for example be driven to the side of the road and brought to a standstill without any sudden speed changes, which could cause problems for other road drivers. The entering of a safe state is for example appropriate, if the driver is unable to drive the vehicle, e.g. having fallen asleep or being unconscious due to a sudden illness. The driver may be informed about that the vehicle is entering the safe state, e.g. by an audible and/or visible and/or haptic signal.

The vehicle may also go to a fully autonomous mode, wherein both the lateral control and longitudinal control is performed autonomously. This may be appropriate if driving at slow speed outside a road, e.g. on a parking area. However, before going to a fully autonomous mode, safety requirements should be considered. Purely as an example, in many countries fully autonomous vehicles are not permitted to drive on the roads.

Figure 3:
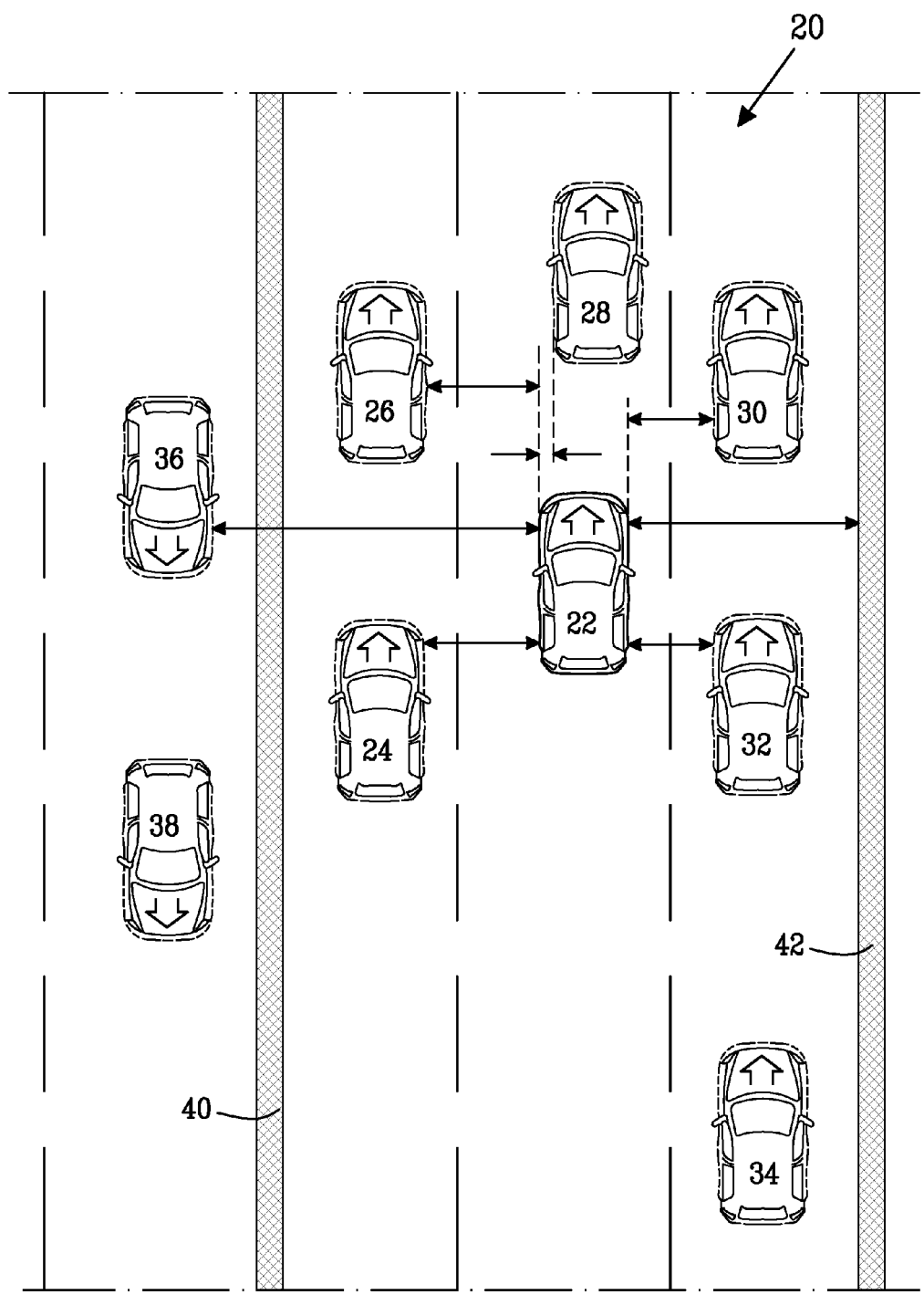
FIG. 3 illustrates a traffic scenario with dense traffic on a motorway.

FIG. 3 illustrates a traffic scenario with dense traffic on a motorway 20. The dense fabric may be caused by a traffic jam. The speeds of the vehicles are then typically low. A vehicle 22, in this case a car, is equipped with a driving assist system 1, like the one illustrated in FIG. 1. The motorway 20 comprises three lanes in the same direction as the vehicle 22 is driving in. The vehicle 22 is surrounded by other vehicles 24, 26, 28, 30, 32 and 34. There are also some vehicles 36, 38 travelling in the other direction in lanes for the other direction. The motorway is delimited by a barrier 40, 42 at either side of the three lanes. It may be a physical barrier or a crossable barrier, such as a painted line. The vehicle 22 equipped with the driving assist system 1 utilizes the detection means 3, e.g. a radar sensor and a vehicle2vehicle communication device, for determining information about static and dynamic objects around the vehicle 22. The system 1 thus determines the lateral distances to the other vehicles 24, 26, 28, 30, 32 and 36 surrounding it, as well as to the barriers 40, 42. The determined information is used as input for the lateral control system 5 to perform autonomous lateral control of the vehicle. Therefore, the vehicle 22 will travel in the desired direction, even if the driver does not hold the hands on the steering wheel.

Moreover, the driver of the vehicle 22 performs himself/herself the longitudinal control of the vehicle 22, by using the longitudinal control means 7, e.g. the accelerator pedal and the brake pedal. By evaluating that the driver reacts in an appropriate way as regards the longitudinal control of the vehicle 22, it is ensured that the driver is mentally present. It is therefore possible to have a high automation level for the lateral control of the vehicle 22.

Purely as an example, the lateral control system 5 may be set to follow the vehicle 28 in front of the vehicle 22 with the driving assist system 1. Then, imagine there is a sudden standstill in the lane the vehicle 22 travels in, e.g. due to a vehicle having broken down. The driver of the vehicle 28 in front therefore decides to change lane to the right-hand side to overtake the broken down vehicle. Thereafter the driver of the vehicle 28 in front returns to the present lane. If the lateral control system 5 is set to follow the vehicle 28 in front, the vehicle 22 with the driving assist system 1 will follow the vehicle 28 in front and also go to the adjacent lane to overtake the broken-down vehicle and then return to the present lane. Such a manoeuvre results in quite large changes of the travelling direction of the vehicle 22 with corresponding torques applied to the steering system of the vehicle 22. However, since it is ensured that the driver is mentally present, it is acceptable for the lateral control system 5 to perform also such sharp turns in an autonomous mode. It is further acceptable for the driving assist system 1 to permit a change of lane.

Figure 4:
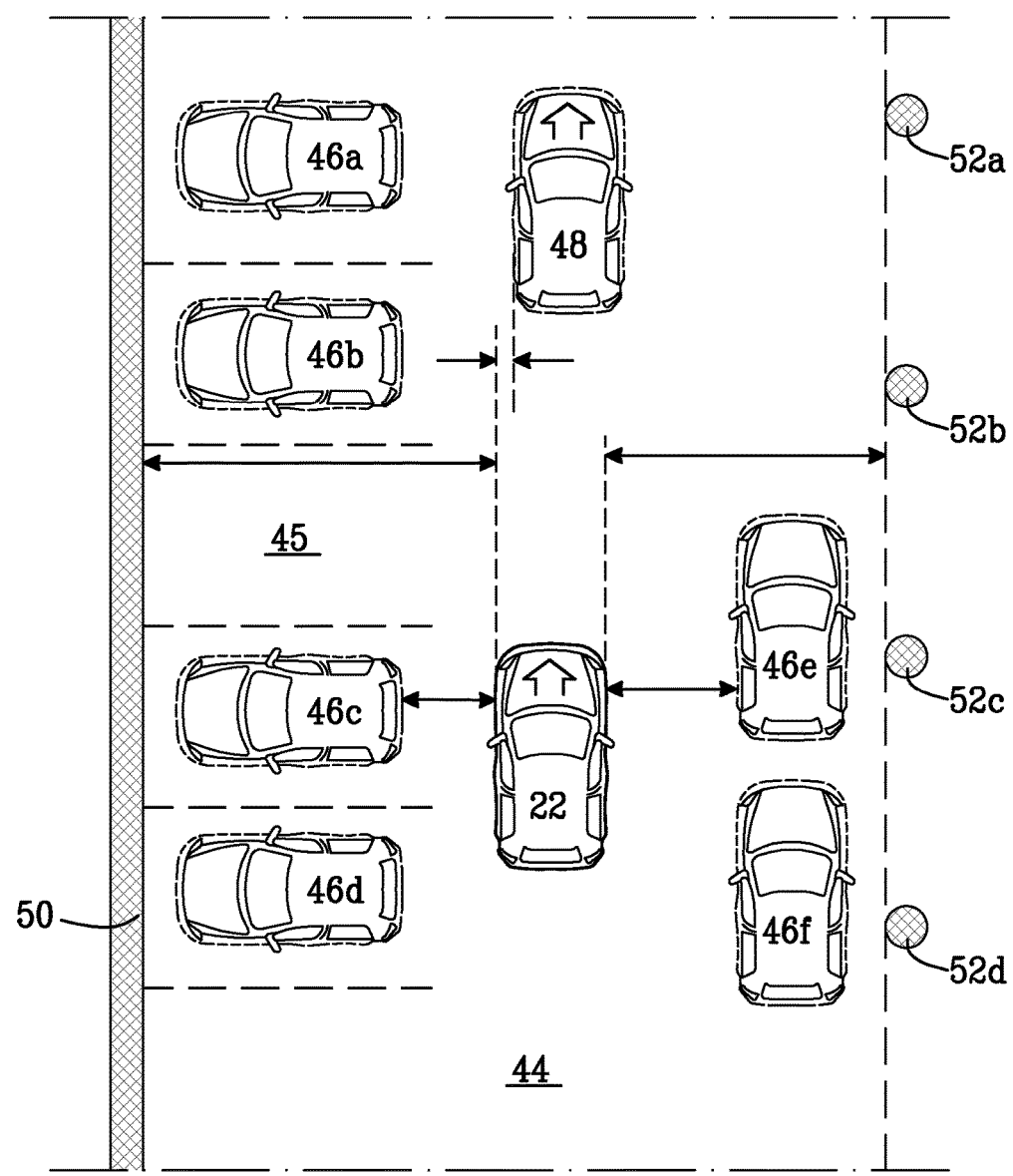
FIG. 4 illustrates a traffic scenario in a parking area.

FIG. 4 illustrates a traffic scenario when driving in a parking area 44. The speed of the vehicle 22 with the driving assist system 1 is slow, since the driver is looking for a free parking place 45. The parking area 44 is filled with other parked vehicles 46a-f. There is also another slow-moving vehicle 48 in front of the vehicle 22 with the driving assist system 1. The parking area 44 is delimited by a barrier 50. The parking area 44 is illuminated by a number of light posts 52a-d. The vehicle 22 with the driving assist system 1 uses the detection means 3, such as a radar, for determining information about the surroundings, including positions of the parked vehicles 46a-f, the slow-moving vehicle 48, the barrier 50 and the light posts 52a-d. The vehicle 22 with the driving assist system 1 may further be provided with a map of the parking area 44, showing e.g. the general layout, the entrance and the exit. The map and the determined information about the surroundings will feed the lateral control system 5 with input, such that it can control the lateral positioning of the vehicle 22. Similar to above, the driver performs the longitudinal control of the 22. Thereby, it is ensured that the driver is mentally present. It is therefore acceptable for the lateral control system 5 to perform the 90 degree turn needed to park in the free parking place 45 in an autonomous mode. Even if the vehicle 22 may use the lines of the parking places as one of the inputs for the detection means 3, the driving assist system 1 also works well on a parking area without painted lines, since the driving assist system 1 uses information about the parked vehicles 46a-f, the slow-moving vehicle 48, the barrier 50 and the light posts 52a-d etc.

Another example of, when the driving assist system 1 according to the disclosure is useful, is when the vehicle 22 with the driving assist system 1 has been parked in the parking place 45 and the driver wants the vehicle 22 to leave the parking area 44. The driver can then let the lateral control system 5 drive the vehicle 22 out of the parking area 44 using determined input of the surroundings and e.g. the above-mentioned map of the parking area 44. In the same way as above, it is ensured that the driver is mentally present by evaluating if the driver performs the longitudinal control of the vehicle 22 in an appropriate way. It is therefore acceptable for the lateral control system 5 to perform the 90 degree turns needed to leave the parking place 45 and exit the parking area 44. The driver only uses the pedals and has the hands may be free for other tasks, e.g. eating a hamburger.

It should be noted that the lateral control system, the checking system, and the means for entering a safe state, as well as any other systems and/or means described herein may comprise one or more control units, electronic control units (ECU) or controllers that may include one or more microprocessors, microcontrollers, programmable digital signal processors (DSP) or other programmable devices and may also, or instead, include an application specific integrated circuit (ASIC), a programmable gate array or programmable array logic, a programmable logic device, or a digital signal processor (DSP), as well as any appropriate vehicle components, devices and/or systems (e.g., radar or other sensors, GPS, steering system, powertrain, braking system, system control units) in order to perform lateral control of the vehicle, checking of the longitudinal control of the vehicle, entering of a safe state and/or any other function or operation described herein.

Where such a control unit, ECU or controller includes a programmable device such as a microprocessor, microcontroller or programmable digital signal processor, such system and/or means may further comprise computer executable code that controls operation of the programmable device to perform the various functions and/or operations described herein. Such a control unit, ECU or controller may receive, evaluate, process, generate and/or transmit information and/or signals from, for or to any appropriate vehicle components, devices and/or systems (e.g., radar or other sensors, GPS, steering system, powertrain, braking system) in order to perform lateral control of the vehicle, checking of the longitudinal control of the vehicle, entering of a safe state and/or any other function or operation described herein.

While exemplary embodiments are described above, it is not intended that these embodiments describe all possible forms. Rather, the words used in the specification are words of description rather than limitation. Further modifications of the disclosure within the scope of the appended claims are feasible. For example, the features of various implementing embodiments may be combined to form further embodiments of the disclosure. As a result, the present disclosure should not be considered as limited by the embodiments and figures described herein. Rather, the full scope of the disclosure should be determined by the appended claims, with reference to the description and drawings.

What is claimed is:

1. A method for assisting a driver of a vehicle comprising:
performing, via a lateral control system, a lateral control of said vehicle in an autonomous mode;
determining, via detection means, information about a surroundings of said vehicle;
checking, via a checking system, a longitudinal control of said vehicle performed by said driver considering the determined information about the surroundings, wherein checking the driver longitudinal control comprises checking whether the driver maintains at least a threshold distance to another vehicle substantially in front of the vehicle, wherein the threshold distance is based on detection of a static and/or dynamic object laterally adjacent to the vehicle, and wherein checking the driver longitudinal control of the vehicle occurs while performing autonomous lateral control of the vehicle; and
continuing said autonomous mode of said lateral control based on said checking.

2. The method according to claim 1, wherein said autonomous mode of said lateral control comprises a change of travelling direction of said vehicle in the range of 0 to +/−30°, preferably 0 to +/−60°, more preferably 0 to +/−90°, most preferably 0 to +/−120°.

3. The method according to claim 1, wherein input from said driver to perform said longitudinal control is given via a longitudinal control means.

4. The method according to claim 3, wherein input from said driver to perform said longitudinal control is given via said longitudinal control means only.

5. The method according to claim 1 further comprising instructing said driver to act, if said check indicates that said longitudinal control of said vehicle performed by said driver fails to meet a distance, time or speed parameter.

6. The method according to claim 1 further comprising leaving said autonomous mode of said lateral control, if said check indicates that said longitudinal control of said vehicle performed by said driver fails to meet a distance, time or speed parameter.

7. The method according to claim 1 further comprising encouraging said driver to take over said lateral control from said lateral control system, if said check indicates that said longitudinal control of said vehicle performed by said driver fails to meet a distance, time or speed parameter.

8. The method according to claim 1 further comprising entering a first state of said vehicle, if said check indicates that said longitudinal control of said vehicle performed by said driver fails to meet a distance, time or speed parameter.

9. The method according to claim 1, wherein said method is performed in urban traffic, e.g. at a speed below 70 km/h, preferably below 50 km/h and most preferably below 30 km/h.

10. The method according to claim 1, wherein said lateral control is at least partly based on detection of a static and/or a dynamic object adjacent to said vehicle.

11. The method according to claim 10, wherein said lateral control is independent of detectable lane markings.

12. A driving assist system for a vehicle, said system comprising:
detection means for determining information about a surroundings of said vehicle;
a lateral control system for performing autonomous lateral control of said vehicle; and
a checking system for checking a longitudinal control of said vehicle performed by a driver of said vehicle considering the determined information about the surroundings, wherein checking the driver longitudinal control comprises checking whether the driver maintains at least a threshold distance to another vehicle substantially in front of the vehicle, wherein the threshold distance is based on detection of a static and/or a dynamic object laterally adjacent to the vehicle, and wherein the checking system checks the driver longitudinal control of the vehicle while the lateral control system is performing the autonomous lateral control of said vehicle;
wherein continuing autonomous lateral control of said vehicle is based on said checking.

13. The driving assist system according to claim 12, wherein said lateral control system is adapted to perform a change of travelling direction of said vehicle in the range of 0 to +/−30°, preferably 0 to +/−60°, more preferably 0 to +/−90°, most preferably 0 to +/−120°.

14. The driving assist system according to claim 12, further comprising means for instructing said driver to act and/or means for entering a first state of said vehicle adapted to be used, if said checking system indicates that said longitudinal control performed by said driver fails to meet a distance, time or speed parameter.

15. The driving assist system according to claim 12, wherein the system assists a driver in urban traffic, e.g. at a speed below 70 km/h, preferably below 50 km/h and most preferably below 30 km/h.

16. A vehicle comprising the driving assist system of claim 12.

17. A method for assisting a driver of a vehicle comprising:
performing a lateral control of said vehicle in an autonomous mode via a lateral control system of said vehicle;
determining information about a surroundings of said vehicle via a sensor;
checking via a controller a longitudinal control of said vehicle performed by said driver considering the determined information about the surroundings, wherein checking the driver longitudinal control comprises checking whether the driver maintains at least a threshold distance to another vehicle substantially in front of the vehicle, wherein the threshold distance is based on detection of a static and/or a dynamic object laterally adjacent to the vehicle, and wherein checking the driver longitudinal control of the vehicle occurs while performing autonomous lateral control of the vehicle; and continuing said autonomous mode of said lateral control based on said checking.

18. The method according to claim 17 further comprising leaving said autonomous mode of said lateral control, if said check indicates that said longitudinal control of said vehicle performed by said driver fails to meet a distance, time or speed parameter.

19. The method according to claim 17 further comprising entering a first state of said vehicle, if said check indicates that said longitudinal control of said vehicle performed by said driver fails to meet a distance, time or speed parameter.

20. The method according to claim 17, wherein said lateral control is at least partly based on detection of a static and/or a dynamic object adjacent to said vehicle and is independent of detectable lane markings.

\* \* \* \* \*